United States Patent
Trentin et al.

(10) Patent No.: US 10,498,205 B2
(45) Date of Patent: Dec. 3, 2019

(54) APPARATUS FOR ASSEMBLING A PERMANENT-MAGNET ELECTRIC MOTOR TO BE USED PARTICULARLY IN PUMPING DEVICES, ELECTRIC MOTOR PRODUCED WITH SUCH APPARATUS, AND ELECTRIC PUMP COMPRISING SUCH ELECTRIC MOTOR

(71) Applicant: DAB PUMPS S.P.A., Mestrino (IT)

(72) Inventors: Enrico Trentin, Frazione Sorio (IT); Francesco Sinico, Montecchio Maggiore (IT); Michele Cappocchin, Mestrino (IT)

(73) Assignee: DAB PUMPS S.P.A., Mestrino (IT)

(*) Notice: Subject to any disclaimer, the term of this patent is extended or adjusted under 35 U.S.C. 154(b) by 156 days.

(21) Appl. No.: 15/290,532

(22) Filed: Oct. 11, 2016

(65) Prior Publication Data

US 2017/0110941 A1    Apr. 20, 2017

(30) Foreign Application Priority Data

Oct. 19, 2015   (IT) .................. 102015000062796

(51) Int. Cl.
| | |
|---|---|
| H02K 15/16 | (2006.01) |
| H02K 13/06 | (2006.01) |
| F04D 25/06 | (2006.01) |
| F04D 13/06 | (2006.01) |
| B25B 27/14 | (2006.01) |

(Continued)

(52) U.S. Cl.
CPC ............. *H02K 15/16* (2013.01); *B25B 27/14* (2013.01); *F04D 13/06* (2013.01); *F04D 25/06* (2013.01); *H02K 5/128* (2013.01); *H02K 7/118* (2013.01)

(58) Field of Classification Search
CPC .... H02K 5/128; H02K 15/00; H02K 15/0006; H02K 15/02; H02K 15/03; H02K 5/1285; H02K 5/132
USPC .................. 29/596, 598; 16/110.1, 422, 427; 81/3.4; 310/87
See application file for complete search history.

(56) References Cited

U.S. PATENT DOCUMENTS 3,870,914 A  *  3/1975  Walker .................. H02K 5/128
                                                          310/105
4,590,668 A  *  5/1986  Peachee, Jr. ........... H02K 15/16
                                                           29/596

(Continued)

FOREIGN PATENT DOCUMENTS

| CN | 1941550 A | 9/2006 |
|---|---|---|
| CN | 102097896 | 6/2011 |

(Continued)

OTHER PUBLICATIONS

Search Report from Italian Patent Appl. No. IT UB20155296, dated Jun. 22, 2016.

(Continued)

*Primary Examiner* — Burton S Mullins
(74) *Attorney, Agent, or Firm* — Ferguson Case Orr Paterson LLP (57) ABSTRACT

An apparatus for assembling a permanent-magnet electric motor to be used particularly in pumping devices, which comprises a tubular element made of non-magnetic material, to be inserted and coupled in the axial cavity of a stator of an electric motor, and adapted to accommodate inside it a rotor of an electric motor.

5 Claims, 8 Drawing Sheets

(51) Int. Cl.
H02K 5/128 (2006.01)
H02K 7/118 (2006.01)

(56) References Cited

U.S. PATENT DOCUMENTS

| | | | |
|---|---|---|---|
| 4,750,872 A * | 6/1988 | Palliser | F04D 13/021 |
| | | | 416/244 R |
| 8,083,500 B1 | 12/2011 | Benno et al. | |
| 8,696,333 B2 * | 4/2014 | Ishiguro | H02K 5/128 |
| | | | 310/87 |
| 2003/0127924 A1 * | 7/2003 | Van Dine | H02K 5/128 |
| | | | 310/87 |
| 2006/0034717 A1 * | 2/2006 | Castellone | H02K 5/128 |
| | | | 417/423.14 |
| 2007/0069841 A1 * | 3/2007 | Kusano | H02K 3/522 |
| | | | 335/202 |

FOREIGN PATENT DOCUMENTS

| | | |
|---|---|---|
| DE | 202013000121 | 1/2013 |
| DE | 102012222358 A1 | 6/2014 |
| EP | 1326320 A2 | 10/2002 |
| EP | 1626478 A2 | 8/2005 |
| GB | 998616 A * 7/1965 | ............ A47J 45/071 |

OTHER PUBLICATIONS

French Office Action for Application No. FR 1660068; dated Apr. 17, 2019.
Chinese Office Action dated Aug. 1, 2019; Application No. 201610911053.8.

* cited by examiner

APPARATUS FOR ASSEMBLING A PERMANENT-MAGNET ELECTRIC MOTOR TO BE USED PARTICULARLY IN PUMPING DEVICES, ELECTRIC MOTOR PRODUCED WITH SUCH APPARATUS, AND ELECTRIC PUMP COMPRISING SUCH ELECTRIC MOTOR

The present invention relates to an apparatus for assembling a permanent-magnet electric motor to be used particularly in pumping devices.

The invention also relates to an electric motor produced with such apparatus, as well as an electric pump that comprises such electric motor.

As is known, pumping devices are typically constituted by a pump body to which an electric motor is coupled.

The pump body has a hollow body provided with ducts for suction and delivery, and within this body one or more impellers are keyed on the shaft for transmitting rotation by the electric motor.

In particular for circulators and electronic pumps, the use is increasingly widespread of permanent-magnet motors, in order to meet the requirement for high performance with medium-to-low power levels.

Assembly of this type of motor has a particular drawback during the positioning of the magnetic rotor inside the stator.

The rotor, in fact, is made of a material with highly magnetic characteristics, which exerts a force of attraction toward any ferromagnetic material.

On an assembly line, this element is difficult to manipulate owing to the presence of numerous tools and components made of ferromagnetic material, and there are also difficulties with its insertion into the stator, where the permanent magnets of the rotor tend to move towards the laminations of the stator and adhere to them, therefore making this assembly step difficult and hazardous for the operator.

The rotor should be inserted in its seat, which centers it on the rotation axis, but if the two elements come into contact before the coupling is achieved, it is substantially impossible to separate them and proceed with the assembly.

Nowadays the problem does not arise in the assembly of permanent-magnet electric motors coupled to pumps that have a supporting structure made of plastic material.

In these cases, the hydraulic part of the pump comprises a space made of plastic material from which a shank extends which contains the rotor and separates it from the stator.

This is the case shown, for example, in EP1801954.

However, there are motors for which the production and performance requirements do not allow the use of a structure made of plastic material.

The aim of the present invention is to provide an apparatus that is capable of making the manipulation of the rotor of a permanent-magnet electric motor easier, by guiding the assembly step.

Within this aim, an object of the invention is to make the steps of mounting the rotor inside the stator safe and easy.

Another object of the invention is to provide an apparatus that is structurally simple and easy to use, which can be produced easily and at low cost.

Another object of the invention is to provide an electric motor which is made with such apparatus.

Another object of the invention is to provide an electric pump that comprises an electric motor which is made with an apparatus according to the invention.

This aim and these and other objects which will become better apparent hereinafter are achieved by an apparatus for assembling a permanent-magnet electric motor to be used particularly in pumping devices, characterized in that it comprises a tubular element made of non-magnetic material, to be inserted and coupled in the axial cavity of a stator of a said electric motor, and adapted to accommodate inside it a rotor of an electric motor.

Further characteristics and advantages of the invention will become better apparent from the description of a preferred, but not exclusive, embodiment of the apparatus according to the invention, which is illustrated by way of non-limiting example in the accompanying drawings wherein.

With reference to the figures, an apparatus according to the invention is generally designated with the reference numeral 10.

The apparatus is designed for the assembly of an electric motor 11 of the type with permanent magnets to be used in pumping devices and to be accommodated inside a motor casing 12 as shown in Figures from 4 to 6, and also 7, 8 and 9.

Figure 4:
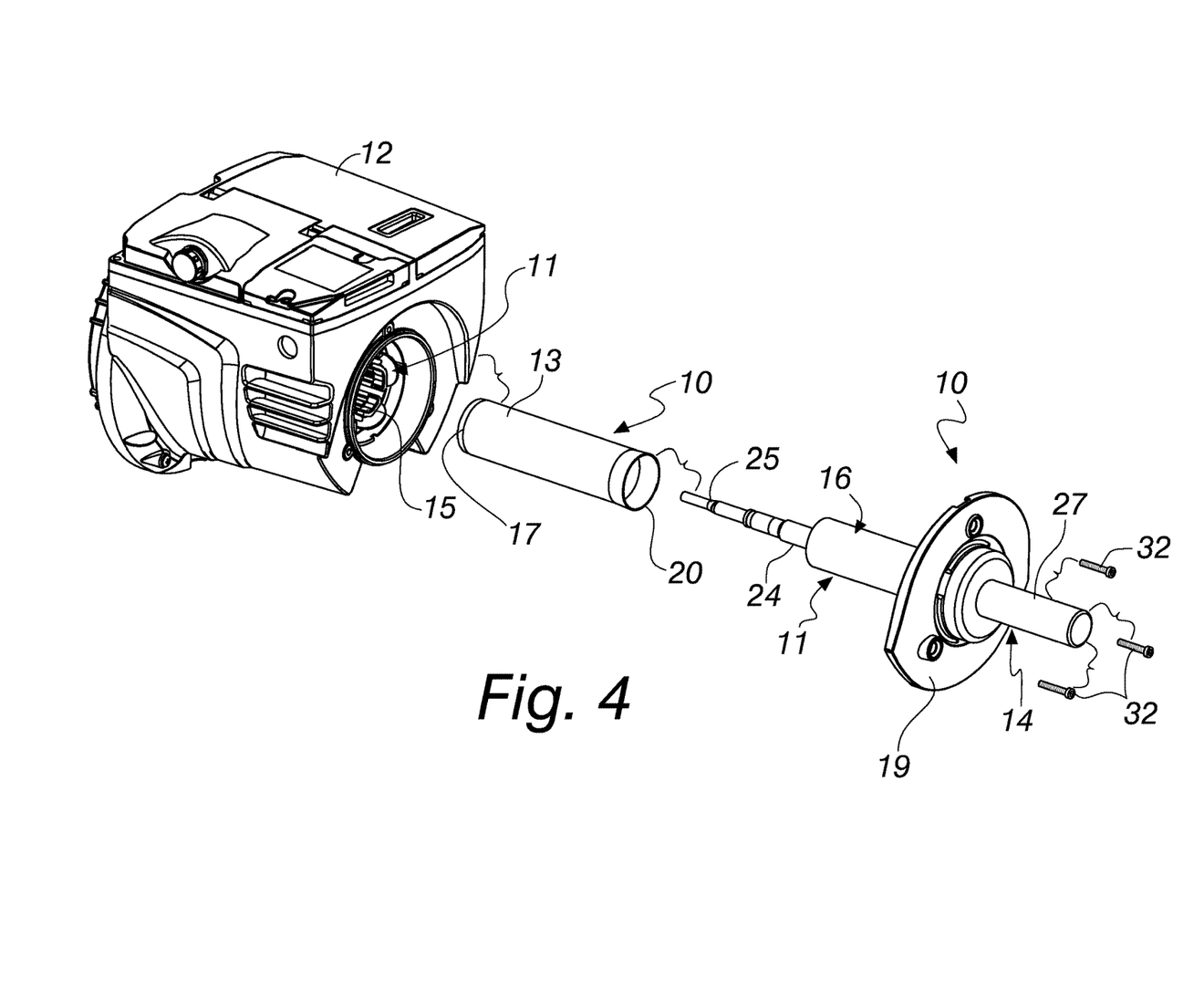
FIG. 4 shows the apparatus according to the invention during a step of assembling the rotor inside the stator.
Figure 5:
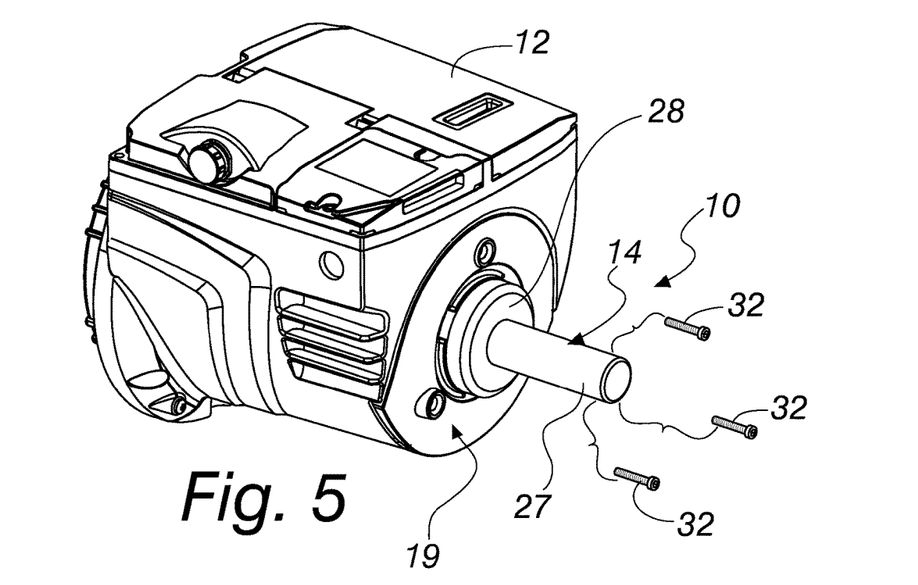
FIG. 5 shows the apparatus according to the invention during another step of assembling the rotor inside the stator.

The apparatus 10 comprises a tubular element 13 and a grip element 14 for the operator, both shown in FIG. 4 and both made of non-magnetic material, preferably made of plastic material.

In particular, the tubular element 13 is made of plastic material or of another material that is not influenced by magnetic influx, and which therefore is not subject to phenomena of magnetic attraction or repulsion between rotor and stator.

The tubular element 13 is adapted to be inserted and coupled in the axial cavity of a stator 15 of the electric motor 11 and is adapted to accommodate inside it a rotor 16 of the electric motor 11.

The tubular element 13 is conveniently hollow and open at its ends.

Figure 7:
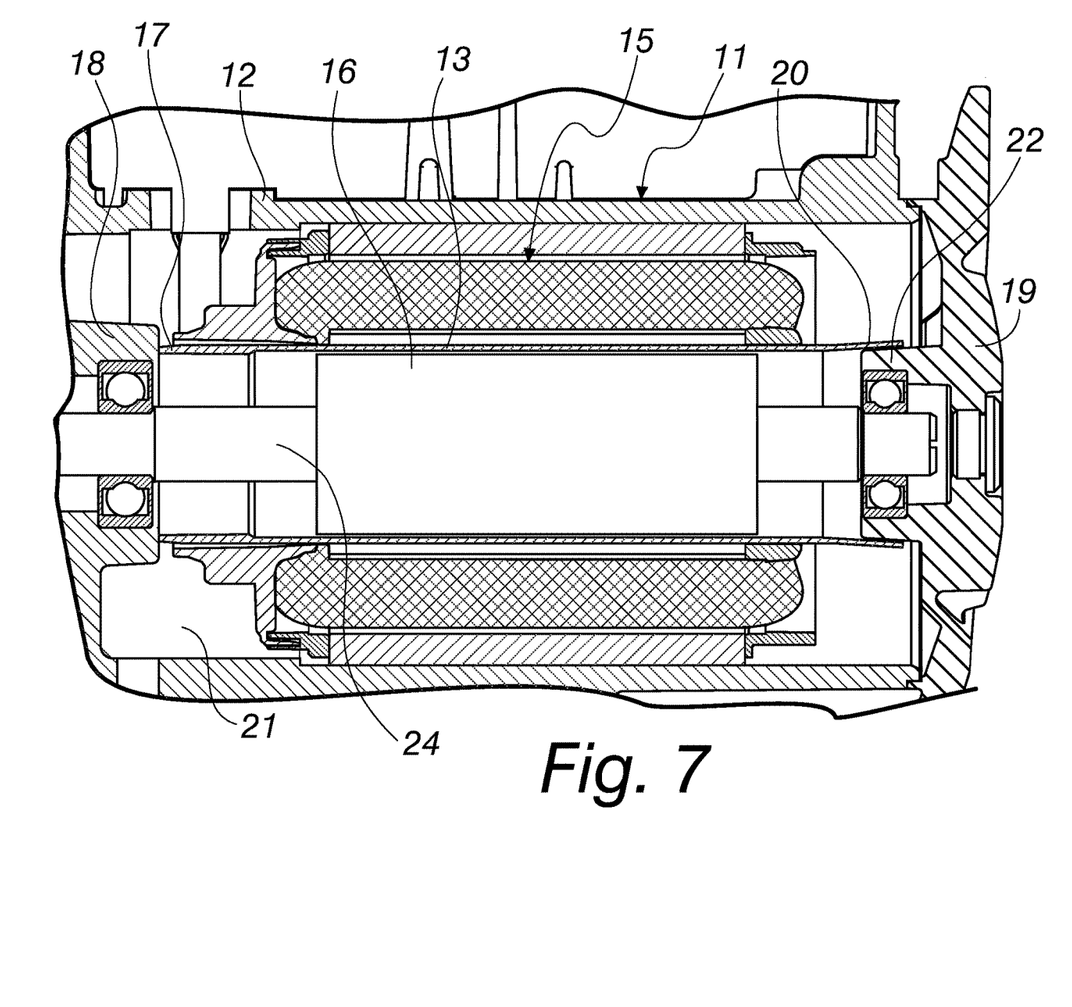
FIG. 7 is a cross-sectional side view of an electric motor assembled with an apparatus according to the invention, in a first variation of embodiment.

In a first variation of embodiment of an electric motor 11, which is also understood to be according to the invention, the tubular element 13 is locked inside the stator 15 by interference fit with the stator 15, as shown in FIG. 7.

In such first variation of embodiment the tubular element 13 has a first end 17 thereof resting against a first bearing-supporting collar 18, inside the space 21 for accommodating the stator 15 in the motor casing 12, while the second, opposite end 20 is fitted over a second bearing-supporting collar 22, which is part of a cover 19 for closing the motor casing 12.

Figure 8:
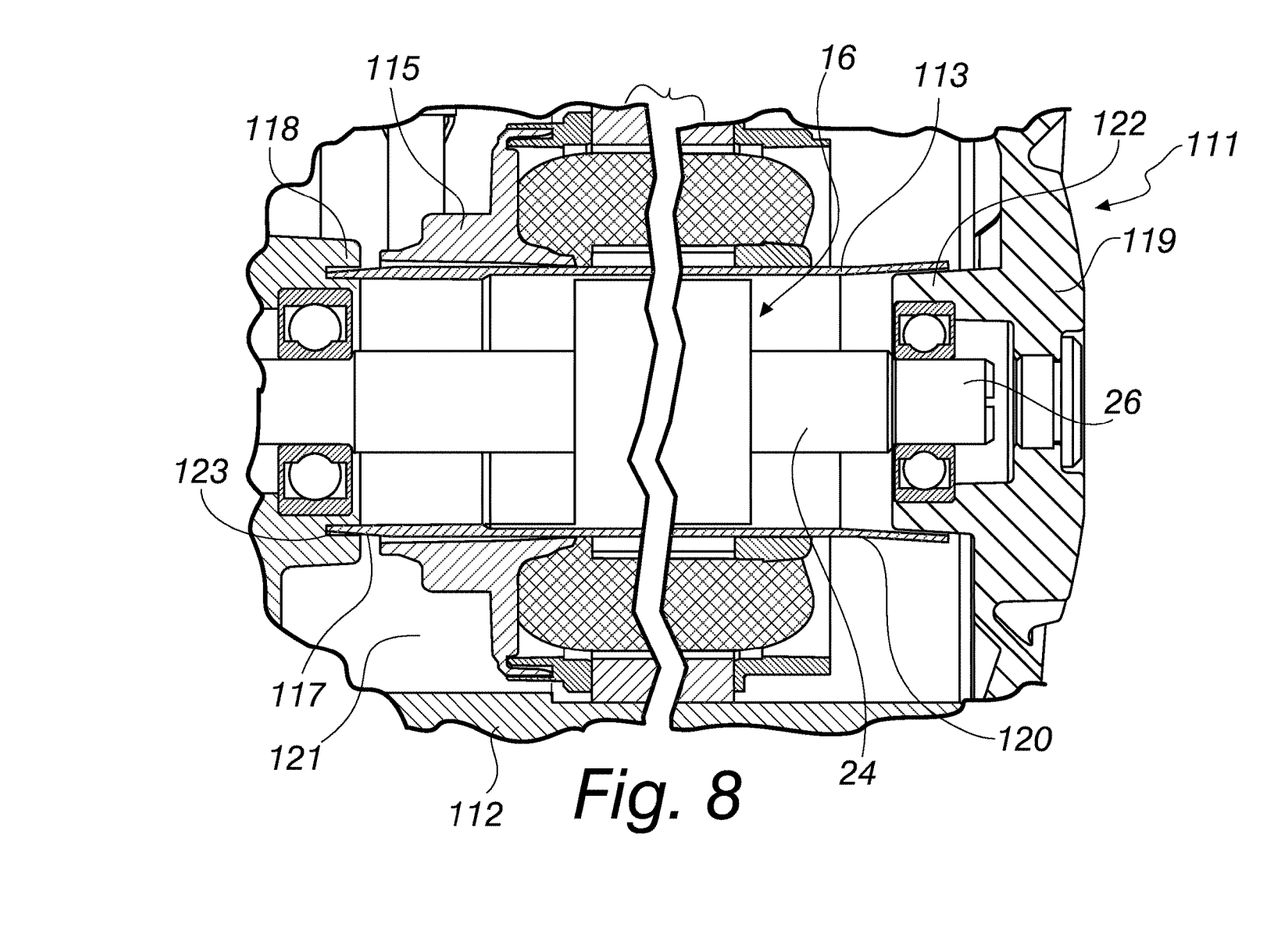
FIG. 8 is a cross-sectional side view of an electric motor assembled with an apparatus according to the invention, in a second variation of embodiment.

In a second variation of embodiment of an electric motor 111, which is also understood to be according to the invention, the tubular element 113 is locked inside the stator 115 by interlocking between a first bearing-supporting collar 118, inside the space 121 for accommodating the stator 115 in the motor casing 112, and a second bearing-supporting collar 122, which is part of a cover 119 for closing the motor casing 112, as shown in FIG. 8.

In particular, a first end 117 of the tubular element 113 is inserted so as to rest in an annular groove 123 defined on the first collar 118, while the opposite, second end 120 of the tubular element 113 is fitted over the second bearing-supporting collar 122.

The rotor 16 has a rotating shaft 24 a first end 25 of which is designed to be introduced first to pass through the motor housing in order to be inserted into the pump body to interact with the impeller elements of the pump, while the second, opposite end 26 is designed to couple with the grip element 14.

The grip element 14 comprises an actuation knob 27 and a supporting and centering portion 28, for example disk-like, shaped complementarily to the corresponding outer contact surface 29 of the cover 19, in order to facilitate the concentricity of positioning between the cover 19, the rotor 16 and the grip element 14.

The grip element 14 can be associated with the shaft 24 of the rotor 16 by way of a threaded coupling, between an axial threaded shank 30 protruding axially from the grip element 14 and a complementarily threaded axial hole 31 defined on the second end of the shaft 24 of the rotor 16.

Figure 1:
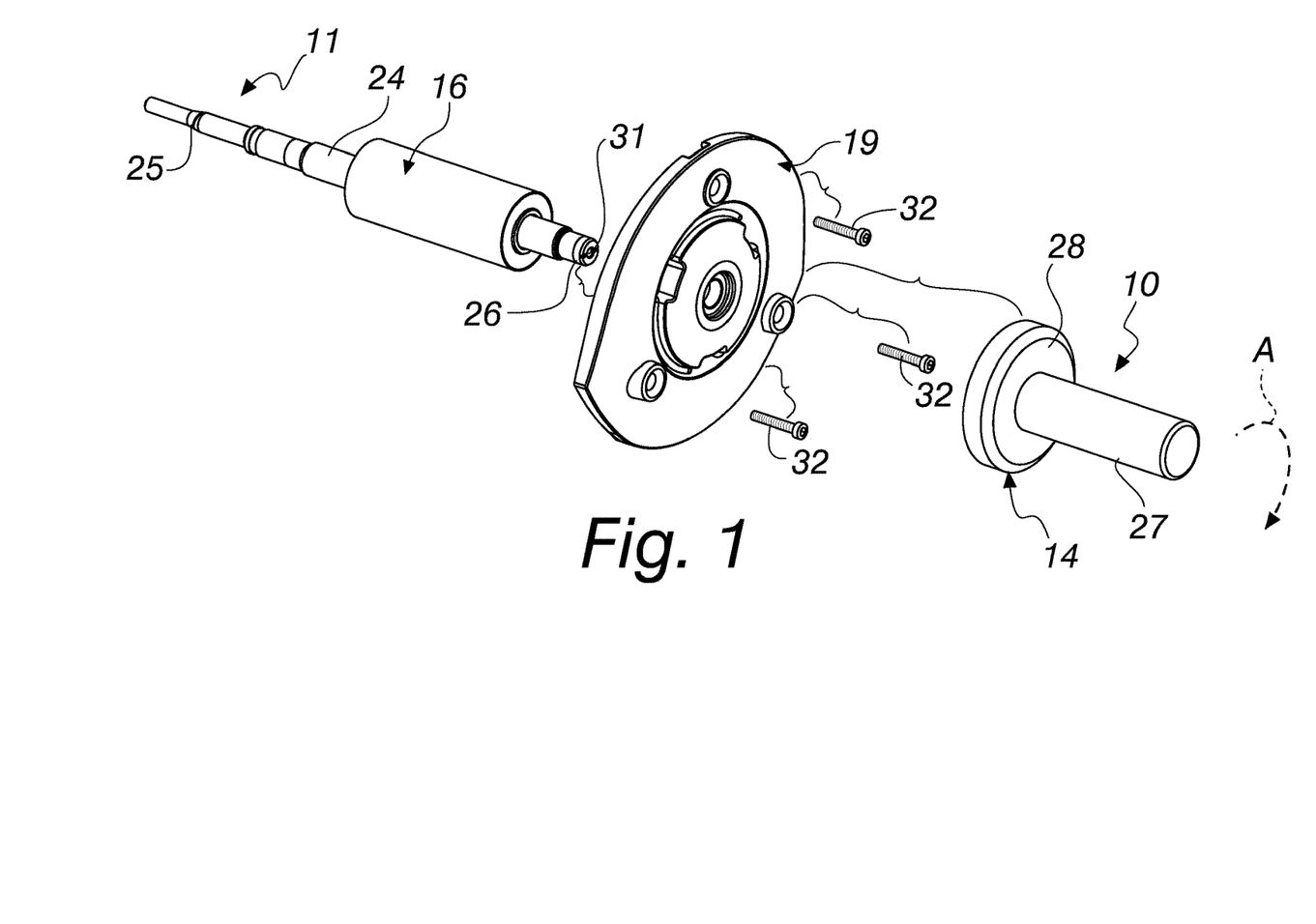
FIG. 1 is an exploded perspective view of a part of an apparatus according to the invention during a step of its use.
Figure 2:
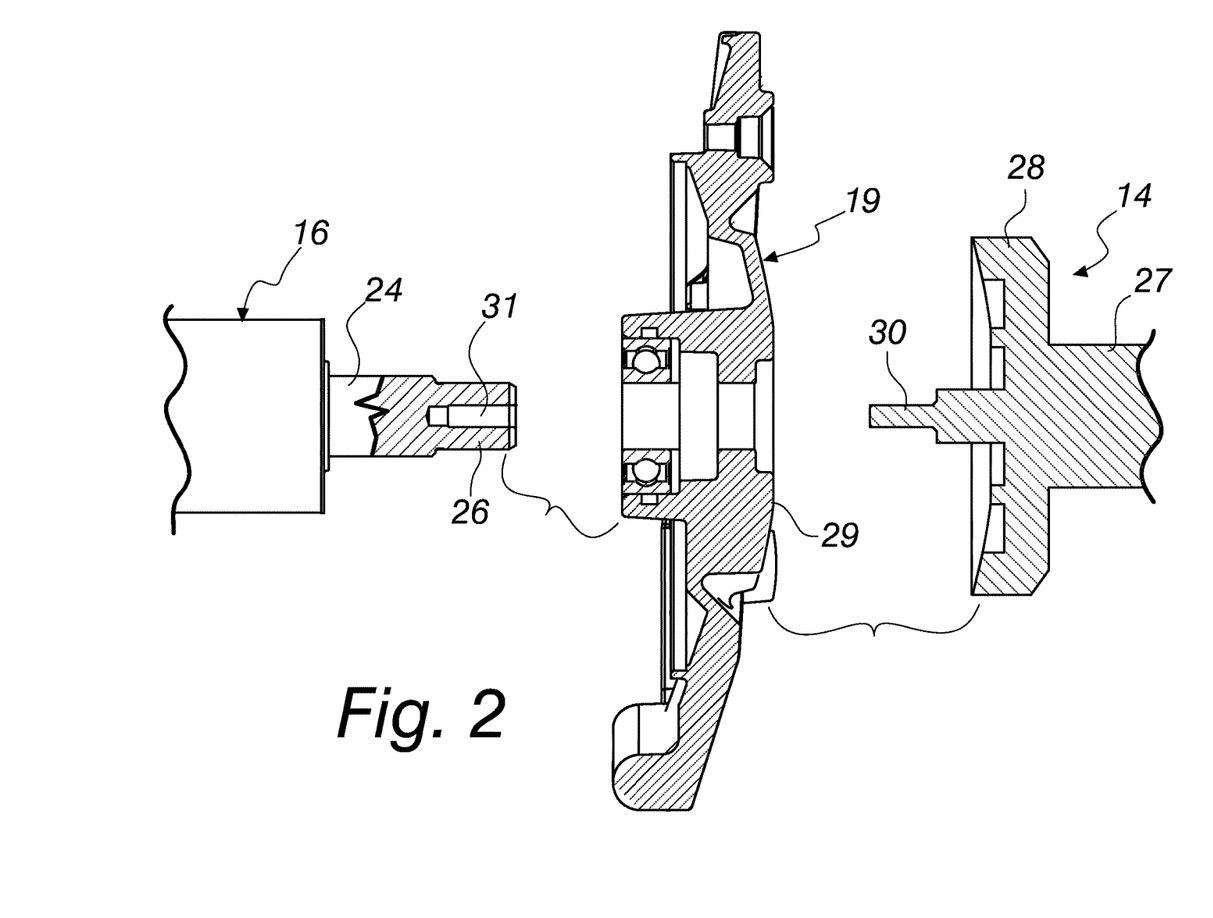
FIG. 2 is a cross-sectional exploded side view of the components of the apparatus of FIG. 1.
Figure 3:
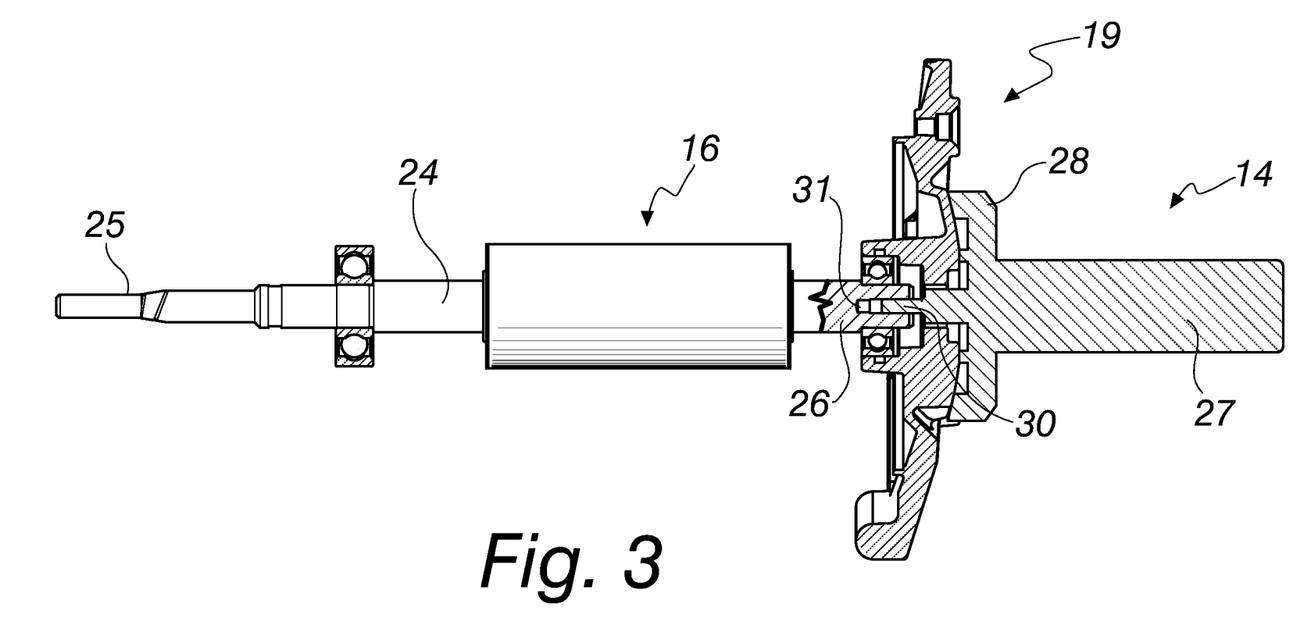
FIG. 3 is a cross-sectional side view of the components of FIG. 1 assembled.

The complementarily-threaded hole 31 is shown in FIGS. 1 and 3.

Figure 6:
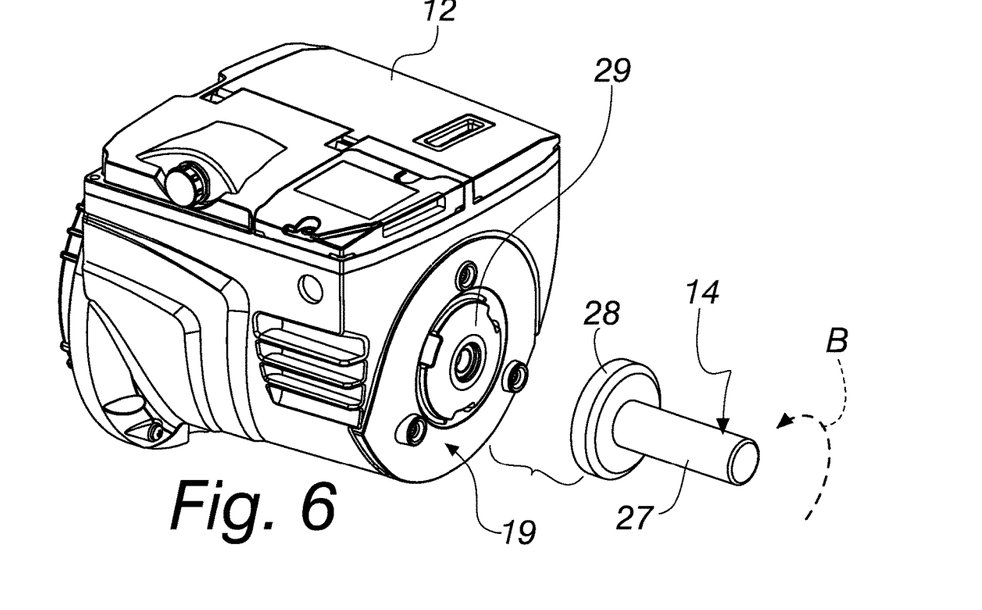
FIG. 6 shows the apparatus according to the invention during a further step of assembling the rotor inside the stator.

In FIG. 1 the reference letter A designates the rotation to be imparted to the grip element 14 in its association with the rotor 16, in order to screw it onto the latter, while in FIG. 6 the reference letter B designates the rotation in the opposite direction to be imparted in order to separate the two elements at the end of the assembly of the electric motor 11.

The figures also show the cover 19 of the motor casing 12, which in the assembly is interposed between the rotor 16 and the grip element 14, and the closure thereof onto the rest of the motor casing 12 occurs by way of the three screws 32.

Use of the apparatus, according to the invention, is the following.

The tubular element 13 is accommodated inside the stator 15, by inserting it with interference as shown in FIG. 7 or by resting and interlocking as shown in FIG. 8.

In this manner it maintains its position inside the cavity of the stator 15.

The grip element 14 is screwed onto the rotor 16, interposing the cover 19 of the motor casing 12 between them, which substantially during assembly separates the magnetic area from the working area.

The operator grips the knob 27 of the grip element 14 in order to insert the rotor 16 inside the tubular element 13 which was previously positioned in the stator 15.

In this manner the tubular element 13 is interposed between the stator 15 and the rotor 16, preventing them from coining into contact.

During insertion the rotor 16 slides inside the tubular element 13 in the stator 15, until it engages in an adapted seat that centers on its rotation axis.

The cover 19 is fixed to the rest of the motor casing 12 by way of the screws 32, and the grip element 14 is unscrewed, as illustrated in FIG. 6.

If maintenance operations on the electric motor are necessary, the motor can be easily dismantled by recoupling the grip element 14 to the rotor 16, in order to extract the latter from the stator 15 after having unscrewed the screws 20 of the cover 19.

During these operations, the presence of the cylindrical element, which is already inside the stator, prevents the rotor from coining into contact with the stator.

The invention also relates to an electric motor 11, which is made with an apparatus 10 as described above, which comprises, inserted and locked inside the stator 15, a tubular element 13 adapted to accommodate inside it the rotor 16 of the electric motor 11.

Figure 9:
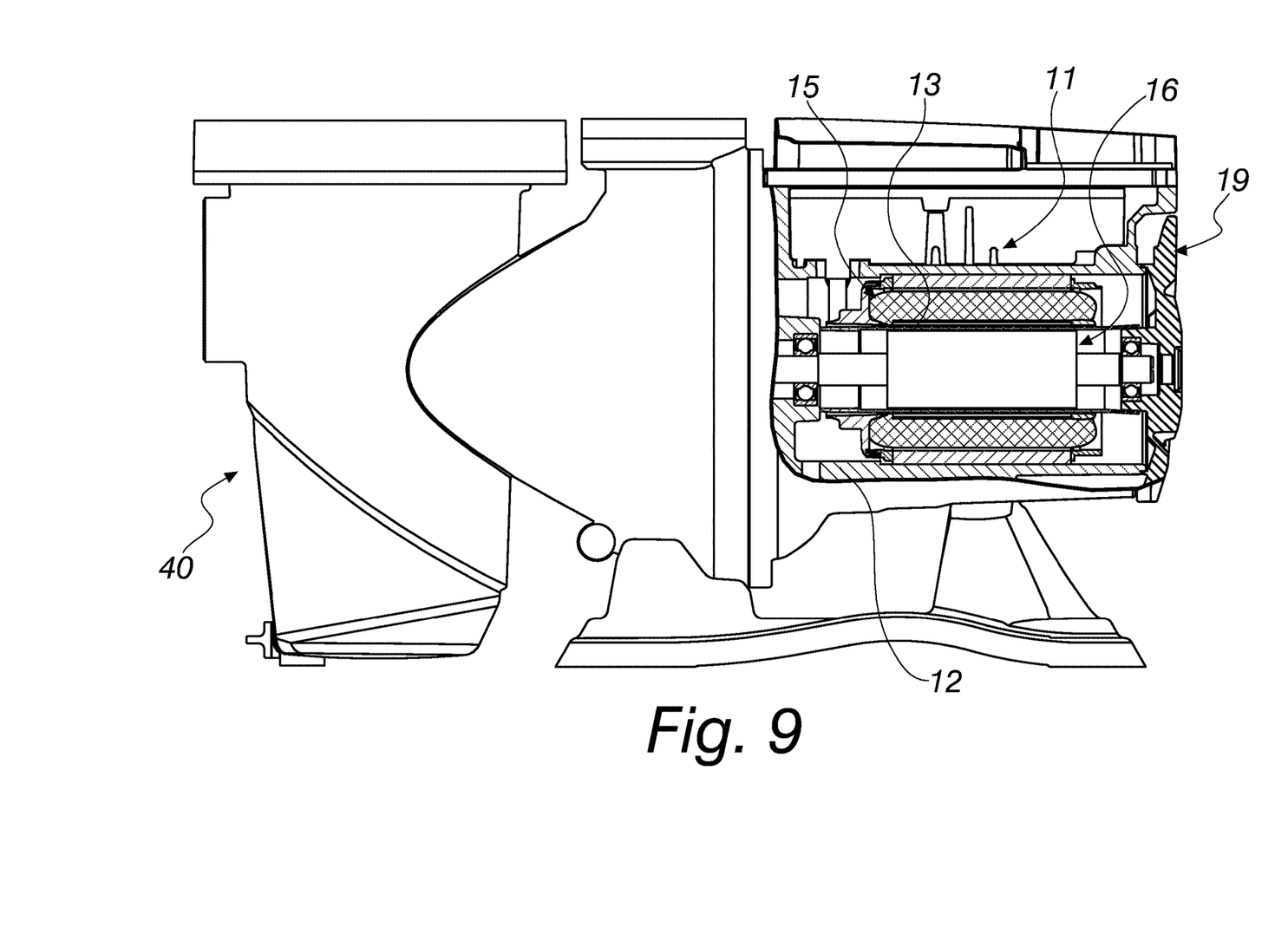
FIG. 9 is a partially cross-sectional side view of a centrifugal electric pump that comprises an electric motor made with an apparatus according to the invention.

The invention also relates to a centrifugal electric pump 40 which comprises an electric motor 11 or 111 as described above.

In practice it has been found that the invention fully achieves the intended aim and objects, by providing an apparatus that is structurally simple and easy to use and to provide, by virtue of which the assembly of a permanent-magnet motor is easy and safe.

Furthermore it should be noted that in the assembling of the electric motor for pumping devices, the possibility of interposing the closing cover of the motor casing between the grip element and the rotor increases the degree of safety for the operator because it separates the magnetic area from the working area.

The invention, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102015000062796 (UB2015A005296) from which this application claims priority are incorporated herein by reference.

What is claimed is:

1. An apparatus for assembling a permanent-magnet electric motor to be used particularly in pumping devices, comprising a tubular element made of non-magnetic material, to be inserted and coupled in the axial cavity of a stator of a said electric motor, and adapted to accommodate inside it a rotor of an electric motor; further comprising a grip element for the operator, to be coupled to one end of said rotor, opposite from an end for insertion into said stator during the assembly of said electric motor;
   wherein said grip element can be coupled to said rotor by way of a threaded coupling;
   wherein said threaded coupling comprises an axial threaded shank protruding axially from the grip element and a complementarily threaded axial hole defined on a second end of the shaft of the rotor.

2. The apparatus according to claim 1, wherein said grip element comprises a knob.

3. The apparatus according to claim 1, wherein said grip element is made of non-magnetic material.

4. An electric motor provided with an apparatus according to claim 1, wherein the tubular element is locked within the stator.

5. A centrifugal electric pump, comprising an electric motor according to claim 4.

* * * * *